Feb. 16, 1937.  C. A. CAWOOD ET AL  2,070,883
ADJUSTABLE HANGER ADAPTER
Filed May 17, 1933
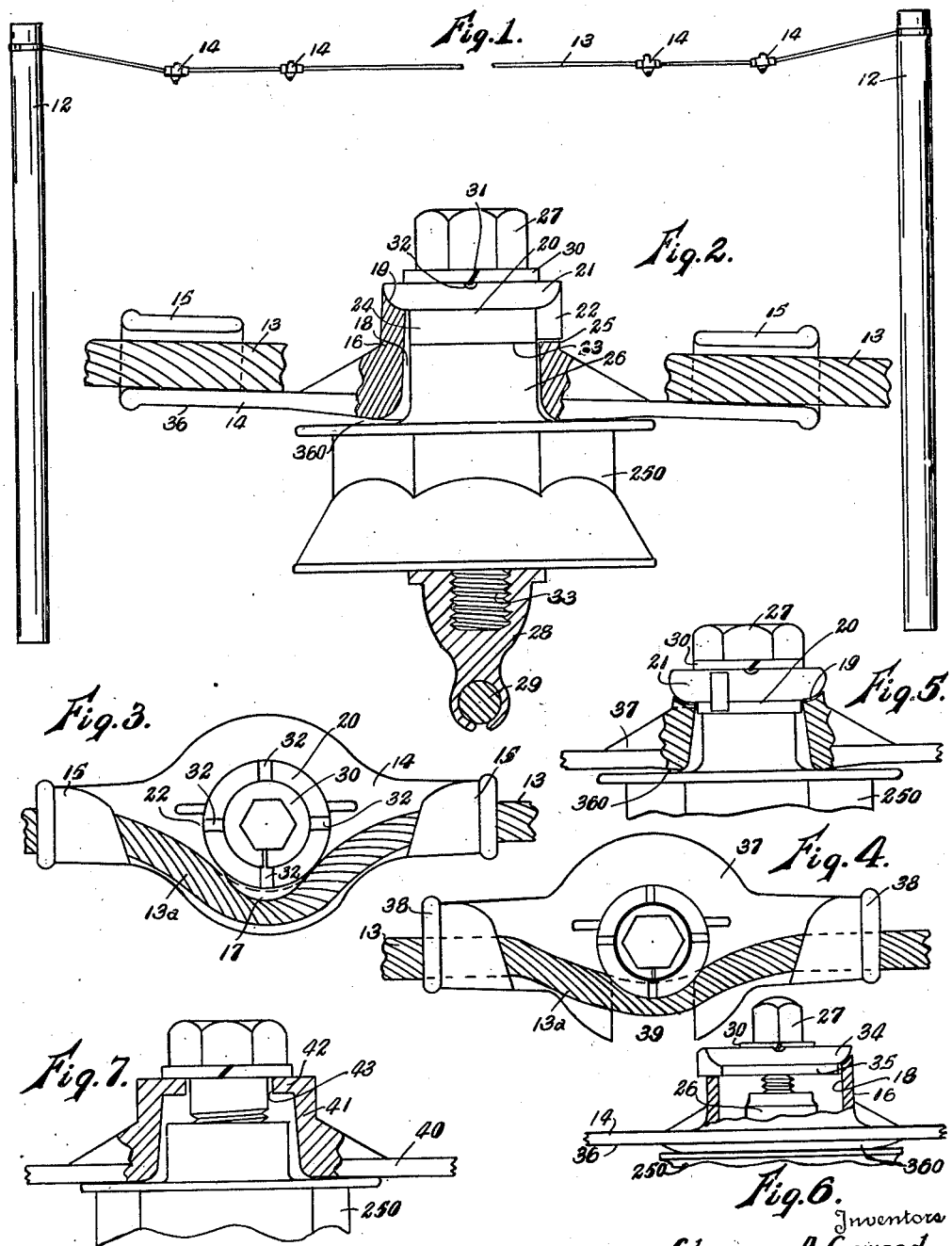
Inventors
Clarence A. Cawood
Lynn Johnston
By Murray and Zugelter
Attorneys Patented Feb. 16, 1937

2,070,883

UNITED STATES PATENT OFFICE 2,070,883

ADJUSTABLE HANGER ADAPTER

Clarence A. Cawood and Lynn Johnston, Cincinnati, Ohio, assignors to The Electric Railway Equipment Company, Cincinnati, Ohio, a corporation of Ohio Application May 17, 1933, Serial No. 671,544

12 Claims. (Cl. 191—42)

The present invention relates to an adjustable hanger adapter and has for an object the provision of an adapter yoke to be installed in the span line or cross strand of an overhead trolley system for street railways and the like.

Another object is to provide such a device as may be once installed and thereafter remain without necessity of removal or slackening of the span line to insert new hangers or to repair or adjust old ones.

Another object of the invention is to provide a hanger adapter whereby necessary alignment of the trolley ear with the trolley wire can be secured with a solid stud type insulated hanger.

Another object of the invention is to provide a support yoke that permits a limited tilting and vertical movement as well as lateral movement of the hanger body, thereby preventing the hammer blow of the trolley collector when passing under the ear.

Another object of the invention is to provide simple means to eliminate the so-called "hard spot" of the trolley wire, and to obtain perfect vertical pendency of the hanger, trolley wire and supporting ear and thus eliminate the undesirable wear and arcing conditions occasioned by the use of the present day one-piece hanger.

Another object is to provide a device of this type which is particularly economical in that it enables the utilization of conventional insulated malleable iron hanger bodies and conventional trolley ears or clamps, and furthermore, provides for the ready replacement and adjustment of said parts without loosening or removing the trolley ear from the wire.

These and other objects are attained by the means described herein and disclosed in the accompanying drawing in which Fig. 1 is a vertical elevational view showing a conventional cross span with two double trolley installations of the devices of the invention disposed relatively close to the poles.

Fig. 2 is an enlarged fragmental detail showing the hanger support of the invention on a sagged cross span with the trolley wire, trolley ear and hanger of conventional insulated malleable iron design supported vertically therefrom, part being shown in cross section.

Fig. 3 is a plan view of a device of the invention with a strand wire in position.

Fig. 4 is a plan view of a modified form of the device.

Fig. 5 is a fragmental elevational view of the modified form of the device shown in Fig. 4, partly in section.

Fig. 6 is a fragmental elevational view of a simple modification of the device attached to a conventional roof hanger that is adapted for use with the device of Figs. 2 and 3 and useable to effect rigid connection of the parts.

Fig. 7 is a fragmental cross sectional view showing another modified form of the device.

The adjustable hanger adapter just mentioned, is designed to avoid the detrimental features of the relatively expensive present day non-armored insulators of the cap and cone and insulated bolt, as well as one-piece hangers, which are accentuated in double trolley construction when four or more hangers and ears are used in each cross span in trolley bus operation as well as with double trolley street cars. Trolley bus operation makes necessary, or at least highly desirable, the suspension of the hangers from the cross span relatively close to the curb, where the poles supporting the cross span are located. Due to the weight of the group of hangers on the cross span there is occasioned an excessive sag in the cross span at the points where the hangers closest the curbs are disposed.

By the simple structure of the present invention vertical suspension of the hanger and trolley ear is made possible with the support yoke tilted at various degrees of angularity by reason of sag in the cross span.

Referring to Fig. 1, the usual street poles 12 would have the usual cross span 13 stretched between them and the yokes 14 of the invention suitably positioned thereon by inserting the cross span in the hook lugs 15 at opposite ends of the yoke body, while the intermediate portion 13a of the cross strand or span is passed about the upstanding neck or hollow sleeve 16 forming an integral part of the yoke. Integral overhanging lug 17, on the side of neck 16 opposite the open mouths of lugs 15, affords a secure seat for the portion 13a of the cross span. After the desired number (e. g. four) of the support yokes has been thus simply hooked onto the loosened cross strand and moved to desired position, the cross strand or span is then tightened and need never again be loosened during the life of the span wire in order to effect replacements or repairs of hangers or wires. The neck 16 has a cylindrical passage or bore 18 extending entirely therethrough and the top edge of neck 16 has an arcuate annular counter-bore 19 for the bore 18. This counter-bore 19 constitutes a socket or seat. A swivel or ball member 20 has an arcuate rim 21 with a single depending lug 22 that extends nearly to the bottom 23 of the cylindrical extension 24 of the swivel member. The neck 16 is slotted at 25 to loosely receive the lug 22 on swivel member 20. The slot 25 and lug 22 are disposed substantially in alignment with the longitudinal center of the yoke body 14 and the hook lugs 15 so that when hanger 250 of the conventional type has the neck or boss portion 26 thereof connected in abutment with the bottom 23 of the swivel member by bolt 27, the hanger member may have a limited degree of tilting movement in the ball and socket joint occasioned between the socket member and the top of the sleeve. Thus, when the support yoke is suspended on the cross span with one of the hook lugs 15 elevated relative to the other, the hanger 25, with clamping ear 28 secured thereto and clamping trolley wire 29, may assume a vertical suspended position. A suitable lock washer 30 is interposed between the head of the bolt and the top of the swivel member 20 and has a down turned lip 31 which may seat in one of the radial notches 32 in the top of swivel member 20.

On the bottom face 36 of support yoke 14 there is preferably provided an annular seat 36a that is desirably, but not necessarily, in the form of a shallow inverted cone. This seat provides a bearing for a portion of the top face of hanger 250 when said hanger is suspended in inclined relation to the support yoke and is raised by the trolley collector. This eliminates the tendency of the trolley collector to produce side sway and maintains the vertical alignment of the unit suspended from the hanger 250.

From the foregoing it will be noted that the removable swivel member 20 is rigidly attached to the top of the hanger boss and that these parts function normally as a unit relative to the support yoke. The weight of the trolley wire will cause the hanger and associated parts to assume a vertical position so that the trolley wheel or current collector may, during passage over the trolley wire, cause a limited tilting of the hanger, by rocking the swivel member in its socket. Likewise the trolley wire, ear, hanger and swivel member are free to rise vertically or tilt when the current collector or trolley wheel passes beneath the hanger and ear, thereby eliminating the "hammer blow" and its undesirable effect. In this way the so-called "hard spot" in the trolley wire is avoided because of the permitted vertical movement of the hanger body relative to the yoke, since the weight of the trolley wire and fittings would normally hold the hanger body away from the yoke for a limited distance. After passage of the trolley wheel or current collector, the ear and hanger assembly may drop to normal vertical position. This vertical yield of the parts to eliminate the "hard spot" or "hammer blow" is attained without the necessity of resorting to intricate internal moving parts within the hanger body and enables the use of the more economical well known armored solid-stud, molded roof hanger such as is shown at 250.

An advantage of having the hanger removable and adjustable lies in the fact that an insulated hanger of any diameter may be inserted at any desired time to accommodate the device to local atmospheric conditions. Hangers of considerably greater insulating capacity may be readily and inexpensively substituted for previously installed smaller hangers, and, if desired, a second hanger 250 may be screwed onto the hanger stud 33, and the trolley ear 28 secured to the corresponding stud of the second hanger. This eliminates the necessity of cutting span wires and insulating between positive and negative trolley wires as now practiced. With the later mentioned attachment of a second hanger in pendant form from the main hanger, it is readily possible to accommodate various conditions with any type of stock roof hanger.

It will be noted that the simple construction illustrated automatically locks all parts in position against loosening under vibration, and that at the same time it is a very simple matter to effect alignment of trolley ears 28 because of the unlimited rotation of the hanger 250 relative to the yoke, when stud 27 is loosened.

Trolley ears 28 may be of any conventional type.

In the modification shown in Fig. 6, the swivel member 34 corresponds substantially to the swivel member 20 of Fig. 2, except that the cylindrical portion 35, disposed inside the bore 18 in neck 16, is shortened, so that the top portion 26 of a hanger such as 250 cannot abut the bottom of the swivel member and is therefore drawn snugly against the bottom face 36 or seat 36a of the yoke body 14. Thus whenever it is desirable to eliminate the free movement of the hanger relative to the yoke, it is necessary only to replace the swivel member 20 of Fig. 2 with the swivel member 34 of Fig. 6. Bolt 27 and suitable lock washer 30 are used to clamp the socket member 34 and the hanger member 250 tightly to opposite sides of the support yoke.

In Figs. 4 and 5 there is illustrated a modification of the device wherein a yoke support body 37 has the cross span receiving lugs 38 (corresponding to lugs 15). The yoke support body 37, including the neck thereof, is slotted out as at 39 to form an opening faced oppositely from the openings in lugs 38 and through which may be inserted the neck or boss 26 of hanger 250. Hanger 250 has mounted on the top of neck 26 one of the swivel members 20 that seats in socket 19. With this form of device it is possible to utilize the portion 13a of a cross span 13 to hold the parts in assembly without the use of bolts. This form has the features of vertical yielding and the vertical positioning of the hanger and attached trolley ear.

In Fig. 7, there is shown a modified form of the device which is also adapted to use with the armored roof type hangers such as 250. The support yoke 40 may be adapted to receive a cross span wire as shown in Fig. 2, or may be provided in any suitable form for rigid connection with support means other than such cross span wire. The body of yoke 40 has an upstanding hollow sleeve 41 with an overhanging flange 42 which has a bore 53 therethrough. An ordinary bolt such as 27 with an interposed lock washer 43 under the head thereof is screwed into the upstanding boss 26 of an ordinary roof type armored insulated hanger such as 250. Any suitable trolley ear such as 28 (of Fig. 2) is screwed onto the stud of the hanger. By tightening the bolt the hanger and appended parts are rigidly clamped to the yoke.

This simple support yoke, it will be noted, also has in common with the other forms illustrated, a hollow neck which receives the upstanding boss of an ordinary malleable iron insulated solid stud roof hanger. Prior to the present invention this sturdy roof hanger was useful only in places having solid ceiling or roof or its equivalent. The invention herein described renders the hanger adaptable to practically any kind of adjustable rigid or yieldable mounting and affords opportunities for large savings in labor for initial installations and repairs and very great savings in the cost of materials in repairs and replacements. In trolley bus and street car installations of devices the very nature of the device provides for longer life of the cheaper hangers.

The devices of the invention are to be understood as subject to modification within the scope and spirit of the appended claims.

We claim:

1. In a device of the class described the combination of a support yoke member for attachment to a cross span wire, said member having a hollow neck having an arcuate seat in the top thereof, a perforate swivel member seated in said arcuate seat, an insulating hanger extending into the hollow neck and means to removably connect the hanger to the swivel member said hanger being rockably suspended by the swivel member on said seat and capable of raising the swivel off the seat upon upward pressure on the hanger.

2. In combination a support yoke having an upstanding hollow neck, said neck having an arcuate annular seat in the top and a notch aligned with the longitudinal axis of the yoke, a swivel member seating in the arcuate seat in the yoke neck, a lug on the swivel member for entry in the notch in the neck, a hanger having an end extending through the hollow neck and a bolt member securing the swivel member to the hanger.

3. In combination a support adapted for mounting directly on a cross span wire, and having an opening therein surrounded by a countersunk arcuate seat, and an insulating hanger having a swivel member at the top to rockably suspend the hanger from said seat on the support.

4. In combination a support yoke having a pair of wire receiving hooked lugs and an intermediate hollow neck whereby the yoke is supported upon a wire, and a hanger having a rounded head portion whereby the hanger is suspended from the yoke, said head being held against rotation and having limited vertical and rocking movement on the neck whereby the hanger assumes a normally vertical position when the yoke is in horizontal or inclined position.

5. In a hanger adapter the combination with a hanger having a threaded bore in the top thereof, of a support yoke having a vertical aperture therein to loosely receive the top of the hanger and means comprising a head rockably received in the top of the aperture in the yoke and a bolt extending through the head and into the threaded bore in the hanger.

6. In combination a support yoke adapted for mounting on a cross member, and having a cup shaped seat in the top thereof, and a hanger having a head formed complementary to said seat and resting loosely on said seat whereby the hanger is suspended vertically from the support while the latter is in horizontal and inclined positions.

7. In combination with a flexible cross support wire of a pair of support yokes frictionally mounted thereon whereby the yokes may respectively assume horizontal and slightly inclined positions, each of said yokes comprising a hollow sleeve-like portion extending vertically of the yoke and furthermore having a substantially conical seat in the top thereof, a hanger for each yoke extending upwardly into the hollow sleeve, means comprising a swivel head co-operating with the seat and secured to the hanger within the sleeve whereby the hanger is supported vertically irrespective of the inclination of the yoke and a trolley hanger secured in depending relation upon each hanger.

8. The combination with a span wire of a support yoke adapted to frictional engagement with said wire and assuming an inclination from the horizontal with the sag of the wire, a metal clad insulating hanger, a clamping ear rigidly attached to the hanger and adapted for mounting to a trolley wire and means comprising a detachable metal head member rigidly connected to said hanger rockably suspended from and having limited vertical movement of play in said supporting yoke.

9. In combination a support yoke member adapted for mounting on a suitable cross member, an insulating hanger having a rigidly attached stud for the reception of a clamping ear, and means to suspend the hanger directly from the yoke and permitting limited vertical and lateral movement of the suspended hanger relative to the yoke.

10. In a device of the class described the combination with a trolley wire, of a suitable trolley ear holding said wire, a roof type insulating hanger rigidly attached to said ear and having an upstanding boss, a suitably supported yoke having a hollow neck for loosely receiving the boss on the hanger and means rigidly connected to the boss and normally resting on the top of said hollow neck to loosely suspend said hanger in said position on said yoke, whereby the hanger, ear and wire remain vertically dependent upon inclination of the yoke, and said yoke may remain stationary under limited rocking and lifting movement of said hanger.

11. The combination with a hanger comprising a shell and a stud fixed in insulated relation thereto, of a metallic head on said hanger, a rigid yoke member directly supporting said shell by said metallic head for limited rocking and lifting movement relative thereto.

12. The combination with a hanger comprising a shell and a stud fixed in insulated relation thereto, of a metallic head for the hanger, a rigid yoke member supporting said shell from said head for limited rocking and lifting movement relative thereto and means removably mounting the head on the hanger for connecting the hanger and yoke in said relation.

CLARENCE A. CAWOOD.
LYNN JOHNSTON.